United States Patent Office 2,805,208
Patented Sept. 3, 1957

2,805,208
PROCESS FOR PREPARING RESINOUS EXPANDED SOLID

Irvan D. Roche, Wilmington, Del., assignor to E. I. du Pont de Nemours and Company, Wilmington, Del., a corporation of Delaware No Drawing. Application November 5, 1952, Serial No. 318,957

1 Claim. (Cl. 260—2.5)

This invention relates to expanded solids such as solid foams, sponges, and the like. More particularly, the invention relates to a novel method for preparing articles by incorporating various substances into a pre-existing expanded solid. In a specific embodiment, the invention is directed to a process for preparing an expanded solid by coating internal surfaces of another expanded solid with the solid to be expanded and, in particular instances, thereafter eliminating the original expanded solid. Numerous other embodiments of the invention, all of which are related to the novel method hereinabove disclosed, are part of the general subject matter of this invention.

Heretofore, urea-formaldehyde solid foams of open cell or closed cell structure were rather well-known in the art and a wide variety of ingenious methods had been disclosed for the preparation of such foams. Rather recently a novel method was described for the preparation of urea-formaldehyde foams of closed cell structure. The latter method involved the preparation of an emulsion of an organic liquid in a liquid urea-formaldehyde condensation product followed by curing the urea-formaldehyde and thereafter removing the organic liquid by vaporization. This method, as described in "The Industrial Chemist," 1949, 423, 566, produced foams having a cell size of 0.15 to 0.9 micron, which were capable of absorbing substantial amounts of liquids such as water. In the copending application of Philip E. Lindvig, S. N. 322,051, filed November 22, 1953, a modification of the emulsification technique was disclosed whereby cellular resins having a substantially closed cell structure of somewhat larger cell size and greatly improved permeability and penetrability by liquids and suspended solids was obtained. In the latter process, cells having predominantly a cell size of 2 to 500 microns were produced by vaporization of an emulsified volatile liquid having a globule size which could be as small as 0.15 to 0.9 micron; the continuous phase in the mixtures employed in the latter process was a viscous urea-formaldehyde liquid and the increase in the size of the individual cells was produced by dilation caused by vaporization of the volatile liquid during the curing of the urea-formaldehyde. In this manner, the cell size was increased. During this dilation of the individual cells some of the volatile liquid escaped as gas and the resulting cellular structure contained microscopic openings in the cell walls and in addition larger openings corresponding to pores or broken windows in the polyhedral cell structure, as a result of which permeation or penetration by liquids or finely divided solids could be very readily achieved. In fact, these structures were characterized by a surprisingly high degree of capillary activity so that even in the absence of externally applied pressure, liquids placed in contact with the expanded solids were very rapidly drawn into the internal structure thereof by a wick-like or blotter-like capillary action. A still further improvement in this art has resulted from the discovery of the fact that polyethylene glycol is an outstanding plasticizer which is effective during the dilation of the continuous phase in the aforesaid process, as a result of which foams of improved strength and capillary permeability are obtained. This is disclosed in copending U. S. patent application S. N. 322,153, filed November 22, 1952.

The present invention is directed to certain novel and practical processes which are made possible by the unique qualities of the solid foams prepared as described in the and copending applications, S. N. 322,051, and S. N. 322,153. The invention involves impregnating the said foams with dispersions of solid materials, whereby the said solids assume the shape or form of the said foam. Other objects of the invention will appear hereinafter.

The present invention provides a method for incorporating a liquid-solid mixture into the internal structure of a solid foam of substantially closed cell structure, which comprises introducing said liquid into virtually all of the cells of the said solid through openings, including microscopic openings, in the cell walls, said cells having predominantly a cell size of .2 to .7 mm., said closed cell structure being a structure produced by vaporization of an emulsified volatile liquid, in a viscous urea-formaldehyde liquid phase while curing the said urea-formaldehyde, dilation of said cells from the said globule size to the said cell size during curing being caused by such vaporization.

The present invention includes providing a process for the preparation of an expanded solid by introducing through capillary action into a solid urea-formaldehyde cellular foam having predominantly a cell size of .2 to .7 mm. a composition comprising a liquid and a solid component and thereafter removing the said liquid component whereby the solid component assumes the internal structure of the urea-formaldehyde solid foam. In still another embodiment, the process of the invention is effective for expanding a solid by coating internal surfaces of the expanded solid with the solid to be expanded and thereafter eliminating the original expanded solid.

The solid component which is introduced into the original expanded solid can be varied rather widely. For example, it can be a synthetic resin such as a thermoplastic resin (e. g. polyethylene, polytetrafluoroethylene, or polymethyl methacrylate). It may also be a resin which can undergo a cure, such as a thermosetting resin or an unvulcanized synthetic elastomer, e. g. polychloroprene, polysulfide rubbers, butadiene-isobutylene copolymer, butadiene-styrene copolymer, and butadiene-acrylonitrile copolymer. The elastomers which may be introduced in this manner include natural rubber as well as mixtures of synthetic elastomers with natural rubber or with one or more other synthetic elastomer rubbers. A preferred synthetic elastomer for use in the practice of this invention is uncured chlorosulfonated polyethylene. In particular embodiments, the chlorosulfonated polyethylene is introduced into the original expanded solid along with finely divided curing agents therefor, such curing agents including, for example, polyvalent metal oxides such as litharge, etc. In addition to these metal oxides, rubber accelerators, etc. may be added if desired. Other solids which may be introduced into the original expanded solid include various organic and inorganic materials such as wood flour, natural soils, cement (calciferous), colloidal silica, metals, etc.

The original expanded solid preferably comprises a urea-formaldehyde solid foam, as described above. Various other resin components may be present in addition to urea-formaldehyde if desired. Furthermore, in preferred embodiments a plasticizer or agent which aids the capillary attraction of the foam for the impregnating liquid may be present with the urea-formaldehyde. Such an agent which is surprisingly effective is polyethylene glycol having from 3 to 25 —$CH_2$—$CH_2O$— groups per molecule, such as polyethylene glycol "400." The content of the polyethylene glycol or equivalent agent may be varied rather widely and is preferably within the range of 10 to 35% of the total weight of the resin solids.

As hereinabove indicated, in practicing one of the embodiments of the invention, the original expanded solid is eliminated after treatment with the added material. For example, when the solid which is introduced into the original expanded solid is polytetrafluoroethylene, and the original expanded solid is an oxidizable substance, destruction of the original expanded solid can be achieved by charring or by oxidation with a gas containing gaseous oxygen. Usually it is not necessary to destroy the skeletal solid. When the original expanded solid is a urea-formaldehyde resin destruction can be achieved by hydrolysis with an aqueous acid. Still another embodiment is to dissolve the original expanded solid in a non-solvent for the solid with which it is impregnated.

One of the most important applications of the present invention is concerned with the manufacture of foamed rubber products especially those made from chlorosulfonated polythene rubber. In the latter embodiment the absorbed ingredients after the removal of the liquid component (which may be toluene or any other inert liquid which fails to dissolve or decompose the original expanded solid) are subjected to curing conditions. These curing conditions include heating the mixture at a temperature within the range from the minimum to the maximum curing temperature of the elastomer, and preferably below the minimum thermal decomposition temperature of the urea-formaldehyde resin. The method can be applied not only in the preparation of cured chlorosulfonated polyethylene foam but also in making foams composed of cured butadiene polymers, cured natural rubber, cured polychloroprene, cured polysulfide rubber, etc. The density of the foamed rubber thus obtained can be varied widely, depending upon the concentration of the elastomer in the penetrating solvent. This feature of the invention is a highly significant one because by the method of this invention it is possible to produce for the first time foamed rubber having a volume of from 100 to 150 times its unfoamed volume.

Furthermore, by the process of the present invention it is relatively easy to prepare solid foams of substances which have heretofore been difficult or impossible to convert into foam-like or sponge-like products. For example, the method of this invention can be employed in the manufacture of polytetrafluoroethylene foams and solid tetrafluoroethylene-chlorotrifluoroethylene interpolymer foams.

The following illustrations of the invention will serve to demonstrate various embodiments thereof. The urea-formaldehyde foams employed in the illustrations given below are prepared by the method disclosed in copending applications S. N. 322,051 and S. N. 322,153. More particularly the procedure employed in preparing the urea-formaldehyde foam was as follows:

To a viscous aqueous urea-formaldehyde resin solution having a formaldehyde-urea mol ratio of 1.8 and a viscosity of 400 centipoises, prepared by the method described in Serial No. 263,520, filed 8–29–50, now U. S. Patent 2,625,524, was added 1% (based on the weight of the resin solids) by weight of "Aresklene" 375 (dibutyl phenyl phenol sodium disulfonate) emulsifying agent. The resulting mixture was cooled to 0° C., and 25% by weight (based on the weight of resin solids) of dichlorotetrafluoroethane was introduced with gentle agitation. In this manner, an emulsion was produced which remained stable at 0° C. Into this emulsion was stirred thoroughly 1% (based on the weight of resin solids) of 85% $H_3PO_4$ and 25% (same basis) of polyethylene glycol "400." The resulting emulsion was immediately sprayed on a support at room temperature whereby it expanded and hardened to produce a layer of cured urea-formaldehyde solid foam. This foam was impregnated with a wide variety of compositions as described below having a normally solid component. In general this was done by soaking the foam in a solution or dispersion of the solid. In a typical experiment a specimen of the foam was immersed in 20% (by weight) solution of chlorosulfonated polyethylene rubber (27.5% Cl, 1.75% S) (a solvent for chlorosulfonated polyethylene is toluene). In addition to the rubber and solvent, this mixture contained per 100 parts of chlorosulfonated polyethylene, the following ingredients which were ball-milled with the above solution: 40 parts tribasic lead maleate, 100 parts n-butanol, 2 parts mercaptobenzothiazole, 3 parts rosin, 25 parts "Monarch" 74 Black pigment, 2 parts of adipic acid (emulsion preservative) 0.1 part sodium oxalate and 1 part of "Kenflex" B (polymerized naphthenic petroleum derivative). These ingredients were almost instantly absorbed into the foam. The resulting product was drained, and then heated for 2.5 hours at 160° C. in an oven. The sponge-like rubber thus obtained had the properties of a cured rubber sponge.

Another material which was distributed throughout the foam in the same manner was a dispersion of polytetrafluoroethylene. The characteristic behavior exhibited was the blotting up of the liquid and the solid into the foam very rapidly and the holding of these ingredients in the cell cavities of the foam by capillary action.

While the presence of the polyethylene glycol modifier is highly effective in speeding up the absorption of dispersed solid substances into the cellular structure of the urea-formaldehyde foams, it should be understood that highly absorptive foams can also be made without the use of polyethylene glycol. A very simple method for making the unmodified foams absorptive, especially in applications in which it is ultimately going to be destroyed, is to subject the foam to a crushing treatment. This results in a rupture of a number of cell windows which in turn permits more rapid adsorption of the dispersions by the solid foams.

The method of this invention is highly useful in the manufacture of very low density foams which can be employed in a wide variety of practical applications, e. g. as heat-insulating compositions.

I claim:

A process for preparing an expanded solid which comprises introducing by capillary action into a solid urea-formaldehyde substantially closed cell foam having predominantly a cell size of 0.2 to 0.7 millimeter, a composition comprising a liquid component, which is chemically inert toward said foam, and solid uncured elastomeric chlorosulfonated polyethylene mixture including a curing agent for said chlorosulfonated polyethylene, thereafter removing the said liquid component whereby the solid component assumes the internal structure of the foam, curing the solid component and destroying, by crushing, the original urea-formaldehyde solid foam whereby the solid which was introduced into the cells remains as an expanded cured form thereof.

References Cited in the file of this patent

UNITED STATES PATENTS

| 2,189,889 | Engel | Feb. 13, 1940 |
| 2,392,521 | Chollar | Jan. 8, 1946 |
| 2,466,027 | Horney et al. | Apr. 5, 1949 |
| 2,507,699 | Edgar et al. | May 16, 1950 |
| 2,542,527 | Honey et al. | Feb. 20, 1951 |

OTHER REFERENCES

Plastics Institute Transactions, April 1948, page 69.
The Industrial Chemist, December 1949, page 571.